US007813854B2

(12) United States Patent
Liaw et al.

(10) Patent No.: US 7,813,854 B2
(45) Date of Patent: Oct. 12, 2010

(54) AUXILIARY STEERING SYSTEM

(75) Inventors: Der-Cherng Liaw, No. 3, Lane 12, Guangming St., Tucheng City, Taipei County (TW); Wei-Chao Chen, Tainan (TW); Wen-Ching Chung, Gukeng Township, Yunlin County (TW)

(73) Assignee: Der-Cherng Liaw, Taipei County (TW)

( * ) Notice: Subject to any disclaimer, the term of this patent is extended or adjusted under 35 U.S.C. 154(b) by 977 days.

(21) Appl. No.: 11/635,515

(22) Filed: Dec. 8, 2006

(65) Prior Publication Data

US 2007/0078578 A1 Apr. 5, 2007

(30) Foreign Application Priority Data

Dec. 9, 2005 (TW) .............................. 94143629 A

(51) Int. Cl.
*B62D 6/00* (2006.01)

(52) U.S. Cl. .......................................... 701/41; 701/42

(58) Field of Classification Search ............. 701/41–44; 180/443, 444, 446

See application file for complete search history.

(56) References Cited

U.S. PATENT DOCUMENTS 7,594,563 B2 * 9/2009 Lutz ........................... 180/402
7,628,244 B2 * 12/2009 Chino et al. ................ 180/402
7,669,689 B2 * 3/2010 Amada ....................... 180/443
7,676,314 B2 * 3/2010 Kato et al. .................... 701/72

FOREIGN PATENT DOCUMENTS

| | | |
|---|---|---|
| TW | 183693 | 12/1991 |
| TW | 375583 | 2/1996 |

* cited by examiner

*Primary Examiner*—Richard M. Camby
(74) *Attorney, Agent, or Firm*—Rosenberg, Klein & Lee

(57) ABSTRACT

The present invention discloses an auxiliary steering system, which is installed in the steering wheel of a vehicle. In the present invention, a gear-operation device is installed in the steering wheel; a dynamic device is installed in steering column of the steering wheel and utilizes a transmission device to drive the gear-operation device; and a controller is connected to the dynamic device and controls the dynamic device to operate the steering wheel. The present invention enables a common vehicle to achieve automatic driving without changing the original vehicle structure. Further, the assistant mechanism of the present invention makes manual driving easier, and the safety mechanism of the present invention makes automatic driving safer.

12 Claims, 2 Drawing Sheets

28
32
22
30
26
25
traffic lane-image detection sensor
lane data
controller
distance data
distance detection sensor
34
steering wheel
touch sensor
steering column
14
dynamic devic
gear-operation device
transmission device
coupling gear
12
20
10
18
electric power module
16
24

AUXILIARY STEERING SYSTEM

BACKGROUND OF THE INVENTION

1. Field of the Invention

The present invention relates to an auxiliary system, particularly to an auxiliary steering system, which can replace the driver to steer a vehicle automatically.

2. Description of the Related Art

Since the automobile was invented more than a hundred years ago, it has made a great influence on our daily living. Nowadays, the automobiles are designed to meet the various requirements of people, and the automobile industry has become the most competitive and creative industry. In the recent years, the human creativity and intelligence have been challenged by people's pursuit of the speed, rigidity and comfortableness of the automobile.

As to the automatic/auxiliary electronic steering mechanisms for automobiles, a Taiwan patent publication No. 183693 proposed an "Automatic Vehicle Guiding System Compatible with the Conventional Systems and a Method Thereof", which is compatible with the existing guidewire systems and provides both guide-wire navigation and communication for autonomous navigation, guidance and wireless communication between a central controller and each vehicle, wherein an angular rate sensing apparatus, in combination with the use of a Kalman filter, allows correction for navigation and guidance errors.

Further, a Taiwan patent publication No. 375583 proposed a "Cooperative Artificial Copilot", which is an intelligent automotive steering system and utilizes a steering actuator and an image sensor to assist the driver in steering the vehicle. The decision center of the cooperative artificial copilot is a microcomputer containing the expert's knowledge on vehicle dynamics. The cooperative artificial copilot constantly monitors the driving status with a steering wheel sensor and an image sensor. In an appropriate timing, the cooperative artificial copilot controls the steering actuator to provide a torque to assist in steering or correcting the steering angle so that the vehicle can run in a traffic lane safely.

However, both of the abovementioned conventional technologies need to modify the original structure/systems of the vehicle. The automatic driving systems being developed currently also lay stress on modifying the steering wheel and replace the steering wheel with a gear disc; such a design not only changes the original structure but also makes the driver unable to directly control the vehicle.

Accordingly, the present invention proposes an auxiliary steering system, which is based on the premise of assisting in manual driving and implementing automatic driving.

SUMMARY OF THE INVENTION

The primary objective of the present invention is to provide an auxiliary steering system, which utilizes an extraneous dynamic device, an extraneous transmission device and extraneous sensors to realize automatic driving.

Another objective of the present invention is to provide an auxiliary steering system, which implements automatic driving with extraneous devices without changing the original vehicle structure.

Further objective of the present invention is to provide an auxiliary steering system, which utilizes an assistant mechanism and a safety mechanism to promote the safety of automatic driving.

According to one aspect, the auxiliary steering system of the present invention comprises: a gear-operation device installed in the steering wheel of a vehicle; a dynamic device installed in the steering column of the steering wheel to drive the gear-operation device with a transmission device; and a controller connected to the dynamic device for controlling the dynamic device to operate the steering wheel.

To enable the objectives, technical contents, characteristics and accomplishments of the present invention, the embodiments of the present invention are to be described in detail in cooperation with the attached drawings below.

DETAILED DESCRIPTION OF THE INVENTION

Figure 1:
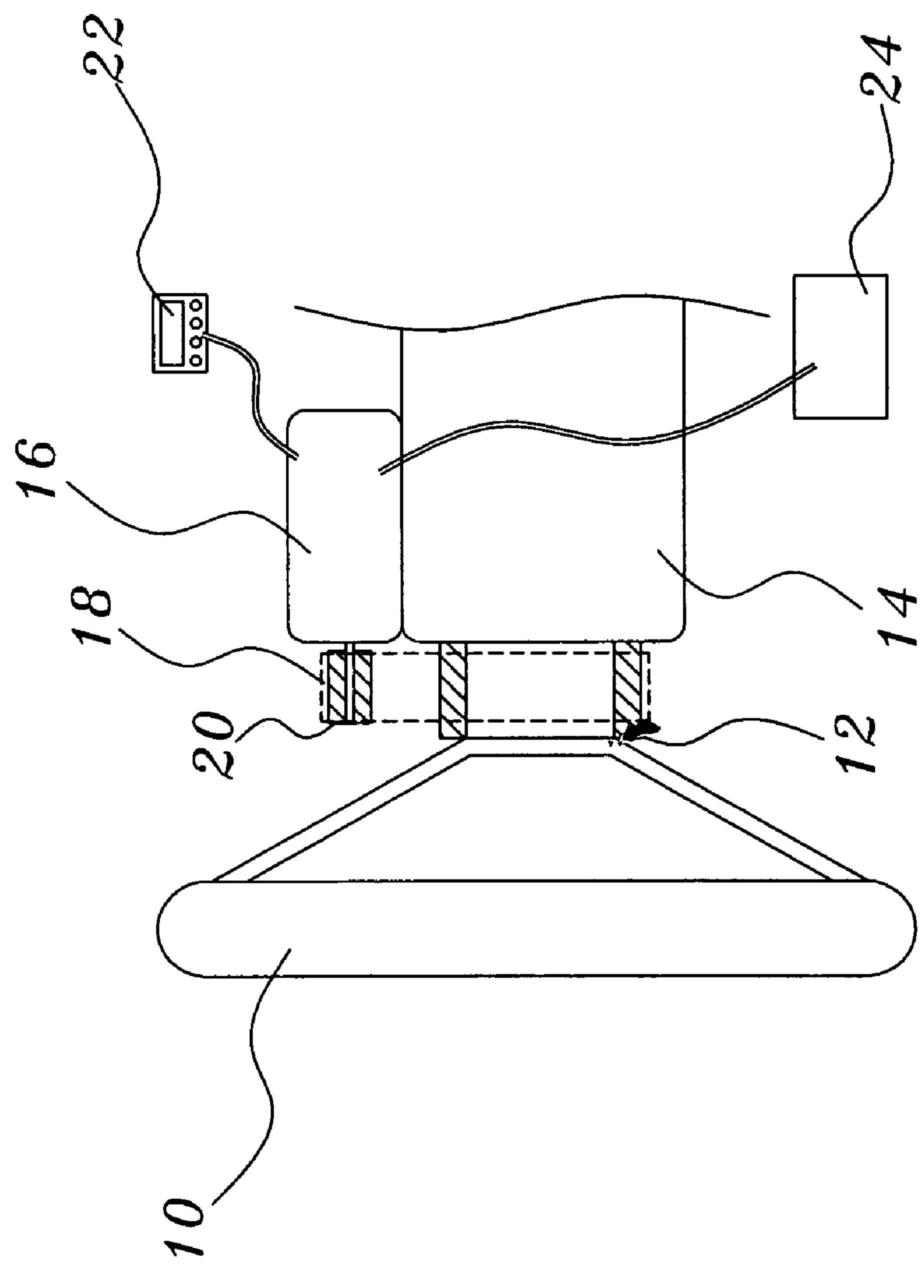
FIG. 1 is a schematic diagram showing the structure of the present invention.

Refer to FIG. 1. The auxiliary steering system of the present invention is installed in the steering wheel 10 of a vehicle, and the steering wheel 10 may be a powered one. The auxiliary steering system of the present invention comprises: a gear-operation device 12, a dynamic device 16 and a controller 22. The gear-operation device 12 is installed in the steering wheel 10. The dynamic device 16 is a motor and installed in the steering column 14 of the steering wheel 10. The dynamic device 16 utilizes a transmission device 18 to drive the gear-operation device 12, and the transmission device 18 is belts or gears. In this embodiment, a coupling gear 20 is installed on the axle of the dynamic device (motor) 16 and coupled to the transmission device 18. The controller 22 is connected to the dynamic device 16 and controls the dynamic device 16 to operate the steering wheel 10. The dynamic device 16 does not need extra power supply but is powered by an electric power module 24 built in the vehicle. The auxiliary steering system of the present invention has been described above, and the operation and safety mechanism thereof are to be described below.

The operation of the auxiliary steering system depends on the driving mode. In the manual driving mode, the system executes an assistant mechanism. When the driver is rotating the steering wheel 10, the assistant mechanism, in cooperation with a touch sensor 34 installed on the steering wheel 10, controls the dynamic device 16 to apply force in the same direction to assist the driver in rotating the steering wheel 10. Thereby, the driver may use less force to rotate the steering wheel 10, and the driving becomes easier.

Figure 2:
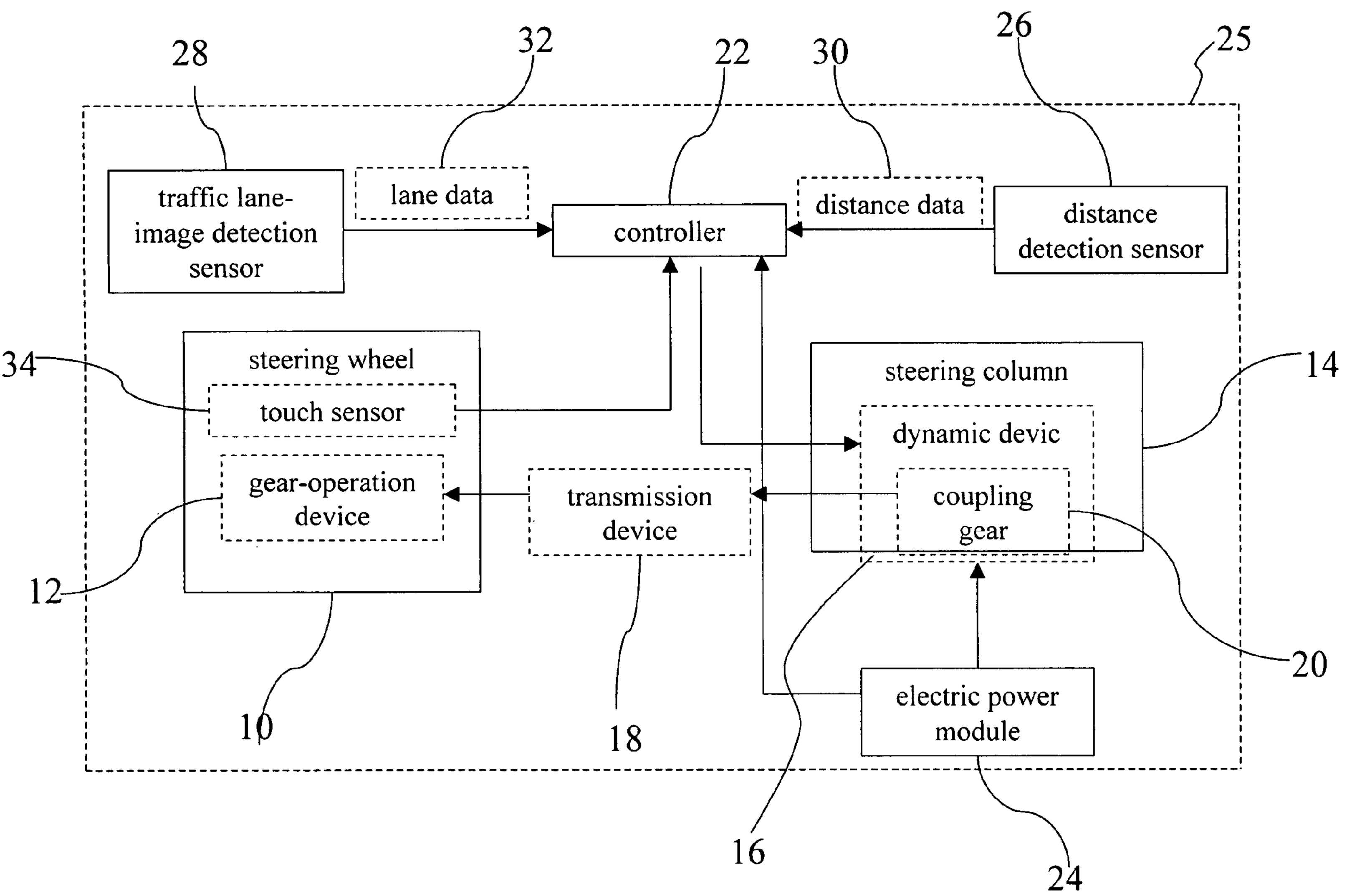
FIG. 2 is a block schematic diagram showing the architecture of the present invention.

Refer to FIG. 1 and FIG. 2. In the automatic driving mode, a computer operates the controller 22, and the vehicle 25 must be equipped with at least one distance detection sensor 26 and at least one traffic lane-image detection sensor 28. The distance detection sensor 26 is used to detect the distances to the surrounding vehicles and/or obstacles and send the distance data 30 to the controller 22. The traffic lane-image detection sensor 28 is used to detect the distances to both sides of the traffic lane and predict the route of the traffic lane and send the lane data 32 to the controller 22. The controller 22, which is a closed-loop control system, controls the dynamic device 16 according to the distance data 30 and the lane data 32. The driver and/or computer send parameters to the controller 22 to control the operation of the dynamic device 16. The parameters include: the distance to the surrounding vehicles, the distance to the front vehicle, and the distance to the lane markings. The auxiliary steering system of the present invention has a safety mechanism. Once the touch sensor 34 installed on the steering wheel 10 detects that the limb of the driver touches the steering wheel 10, the safety mechanism immediately stops the operation of the dynamic device 16; thereby, the steering wheel can be rotated freely, and the driver can resume the control over the steering wheel 10, especially in an emergency. The safety mechanism may be installed in the controller 22, including a force button, whereby the driver may perform a force switching or a force interruption.

With the premise of not changing the original vehicle structure, the present invention enables a common vehicle to achieve automatic driving with the extraneous devices, such as the dynamic device 16, transmission device 18, distance detection sensor 26 and traffic lane-image detection sensor 28. Further, the assistant mechanism and the safety mechanism of the present invention make automatic driving safer.

Those described above are the embodiments to exemplify the present invention to enable the persons skilled in the art to understand, make and use the present invention. However, it is not intended to limit the scope of the present invention. Any equivalent modification and variation according to the spirit of the present invention is also to be included within the scope of the claims stated below.

What is claimed is:

1. An auxiliary steering system, installed in a steering wheel of a vehicle, and comprising:

a gear-operation device installed in said steering wheel;

a dynamic device installed in steering column of said steering wheel and utilizing a transmission device to drive said gear-operation device;

a controller coupled to said dynamic device and controlling said dynamic device to operate said steering wheel.

2. The auxiliary steering system according to claim 1, wherein said transmission device is a belt or at least one gear.

3. The auxiliary steering system according to claim 1, wherein said dynamic device is a motor, and axle of said motor has a coupling gear coupled to said transmission device.

4. The auxiliary steering system according to claim 1, wherein said controller is operated by a computer.

5. The auxiliary steering system according to claim 4, wherein at least one distance detection sensor is installed in said vehicle and used to detect distances to surrounded vehicles and/or obstacles and send a distance data to said controller; and said controller controls said dynamic device according to said distance data.

6. The auxiliary steering system according to claim 4, wherein a traffic lane-image detection sensor is installed in said vehicle and used to detect distances to lane markings and predict a run of traffic lane and send a lane data to said controller; and said controller controls said dynamic device according to said lane data.

7. The auxiliary steering system according to claim 1, wherein said vehicle has an electric power module to power said dynamic device.

8. The auxiliary steering system according to claim 1, further comprising a safety mechanism, which enables a driver to coercively stop operation of said auxiliary steering system.

9. The auxiliary steering system according to claim 8, wherein said steering wheel is equipped with a touch sensor; once said touch sensor detects that limbs of said driver touches said steering wheel, said safety mechanism immediately stops operation of said dynamic device, and said steering wheel can thus be rotated freely.

10. The auxiliary steering system according to claim 8, wherein said safety mechanism is installed in said controller and includes a force interruption button.

11. The auxiliary steering system according to claim 1, wherein said controller is a closed-loop control system; a computer and/or an user send parameters to said controller to control operation of said dynamic device.

12. The auxiliary steering system according to claim 1, further comprising an assistant mechanism, wherein said assistant mechanism is executed in manual driving mode; once a driver rotates said steering wheel, said assistant mechanism simultaneously controls said dynamic device to output force to assist said driver in rotating said steering wheel, and said driver can thus apply less force to rotate said steering wheel.

* * * * *